(12) United States Patent
Togawa

(10) Patent No.: US 7,430,366 B2
(45) Date of Patent: Sep. 30, 2008

(54) IMAGE CAPTURE DEVICE

(75) Inventor: Tsuyoshi Togawa, Hachioji (JP)

(73) Assignee: Olympus Corporation, Tokyo (JP)

( * ) Notice: Subject to any disclaimer, the term of this patent is extended or adjusted under 35 U.S.C. 154(b) by 70 days.

(21) Appl. No.: 11/293,475

(22) Filed: Dec. 1, 2005

(65) Prior Publication Data

US 2006/0098967 A1 May 11, 2006

Related U.S. Application Data

(63) Continuation of application No. PCT/JP2004/007460, filed on May 25, 2004.

(30) Foreign Application Priority Data

Jun. 9, 2003 (JP) ............................ 2003-163926

(51) Int. Cl.
*G03B 17/00* (2006.01)
*G03B 17/38* (2006.01)
(52) U.S. Cl. ...................... 396/53; 396/55; 396/502; 348/208.2
(58) Field of Classification Search ............... 396/53, 396/55; 348/208.2, 208.7, 208.8, 333.01
See application file for complete search history.

(56) References Cited

U.S. PATENT DOCUMENTS

| 5,649,237 | A | | 7/1997 | Okazaki |
| 5,794,078 | A | * | 8/1998 | Okazaki ..................... 396/50 |
| 6,014,169 | A | * | 1/2000 | Azusawa et al. ......... 348/208.8 |
| 6,047,132 | A | | 4/2000 | Maeda |
| 6,873,357 | B2 | * | 3/2005 | Fuchimukai et al. ..... 348/208.2 |

| 2002/0036702 | A1 | | 3/2002 | Ohnogi |
| 2002/0097497 | A1 | | 7/2002 | Kamo |
| 2003/0095797 | A1 | * | 5/2003 | Nakata ..................... 396/54 |

FOREIGN PATENT DOCUMENTS

| JP | 7-225405 A | 8/1995 |
| JP | 9-218435 A | 8/1997 |
| JP | 9-284637 A | 10/1997 |
| JP | 10-301157 A | 11/1998 |
| JP | 2872509 B2 | 1/1999 |
| JP | 11-183952 A | 7/1999 |
| JP | 11-249185 A | 9/1999 |
| JP | 11-271831 A | 10/1999 |
| JP | 2000-298300 A | 10/2000 |
| JP | 3170716 B2 | 3/2001 |
| JP | 2001-154225 A | 6/2001 |
| JP | 2002-98915 A | 4/2002 |
| JP | 2002-101329 A | 4/2002 |
| JP | 2002-112101 A | 4/2002 |

OTHER PUBLICATIONS

Notification of Transmittal of Copies of Translation of the International Preliminary Report on Patentability, Chapter I of Chapter II of the Patent Cooperation Treaty for PCT/JP2004/007460, 5 sheets, Apr. 24, 2006.

* cited by examiner

*Primary Examiner*—W. B. Perkey
(74) *Attorney, Agent, or Firm*—Frishauf, Holtz, Goodman & Chick, P.C.

(57) ABSTRACT

An image capture device is disclosed which is equipped with an imaging unit, a first motion detector adapted to detect the rotational component of motion, a second motion detector adapted to detect the translational component of the motion, and an image blur compensation unit adapted to make compensation for image blur on the imaging unit on the basis of output signals of the first and second motion detectors.

8 Claims, 8 Drawing Sheets

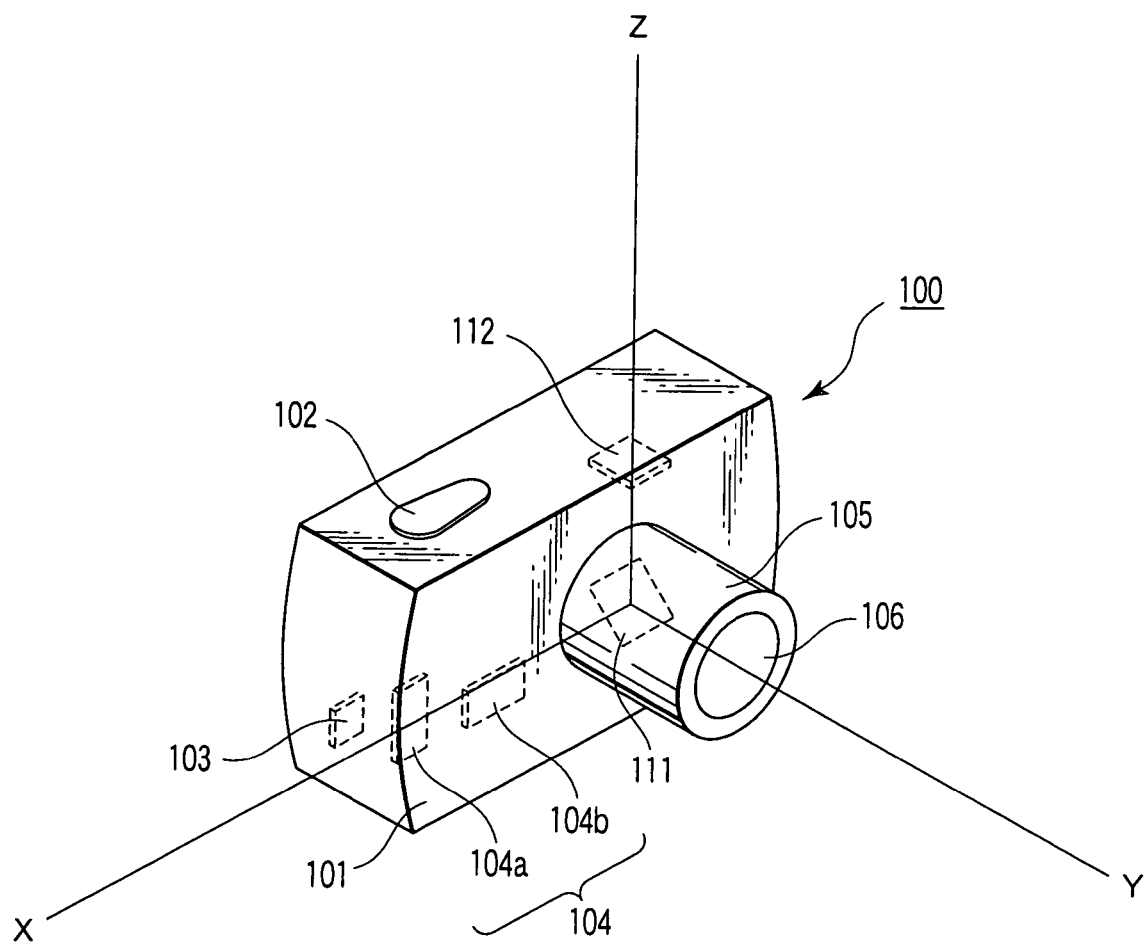
F I G. 1

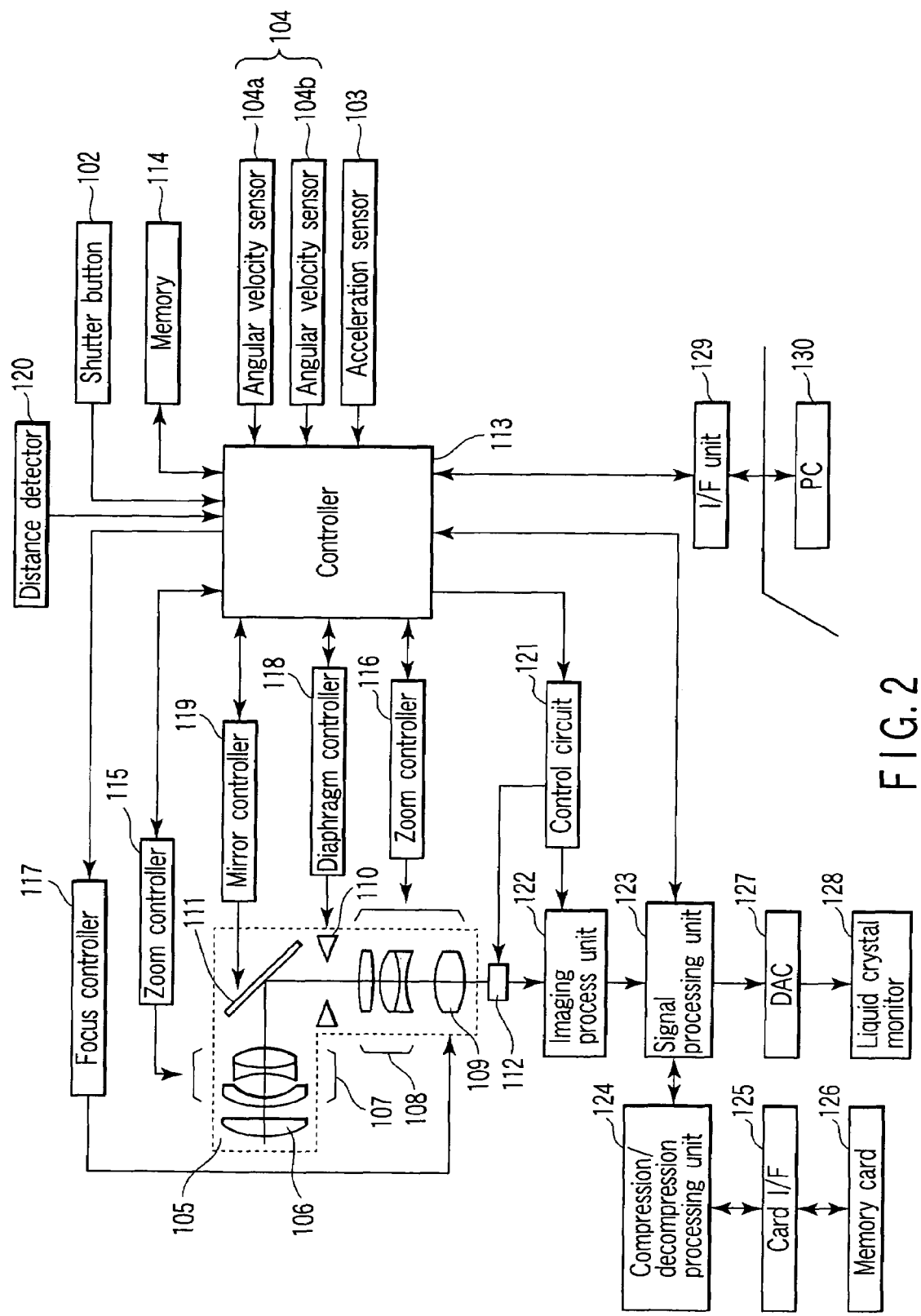
F I G. 2

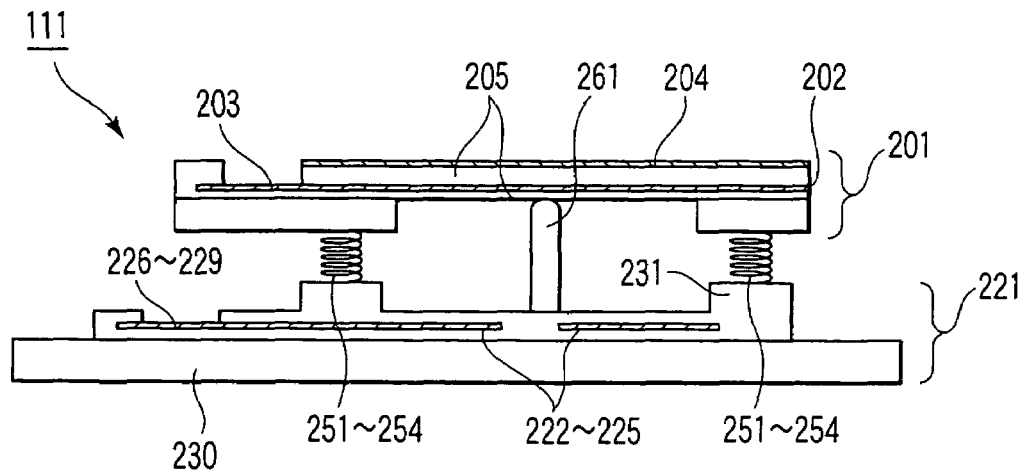
FIG. 3
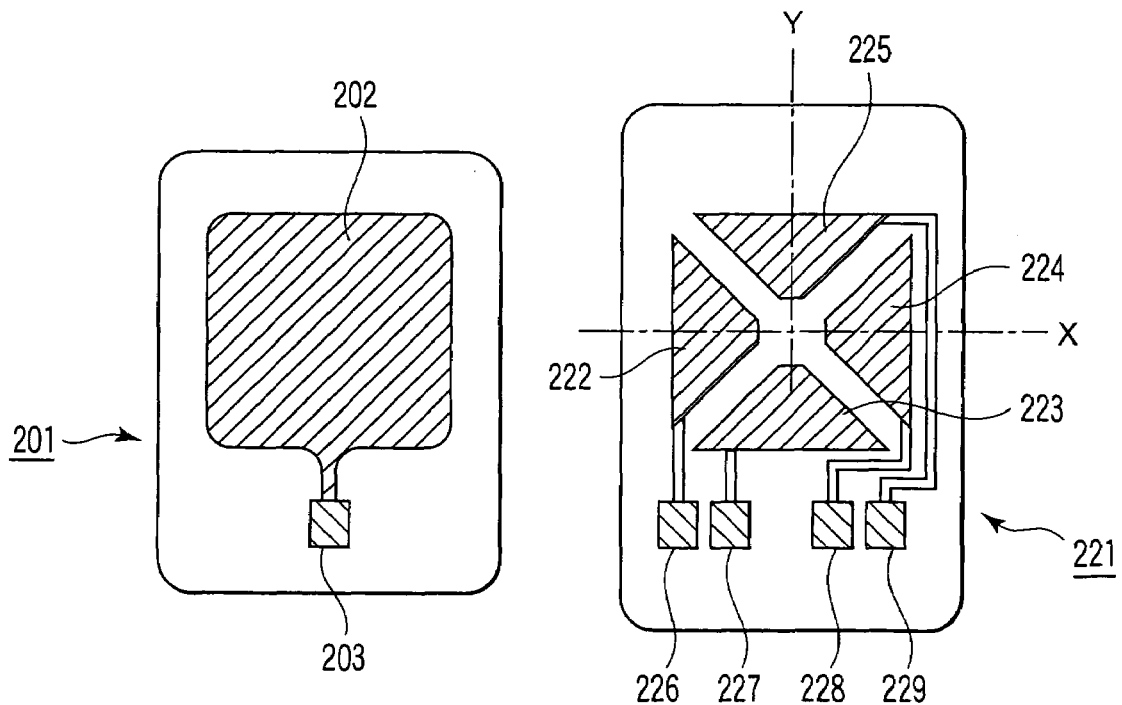
FIG. 4A
FIG. 4B

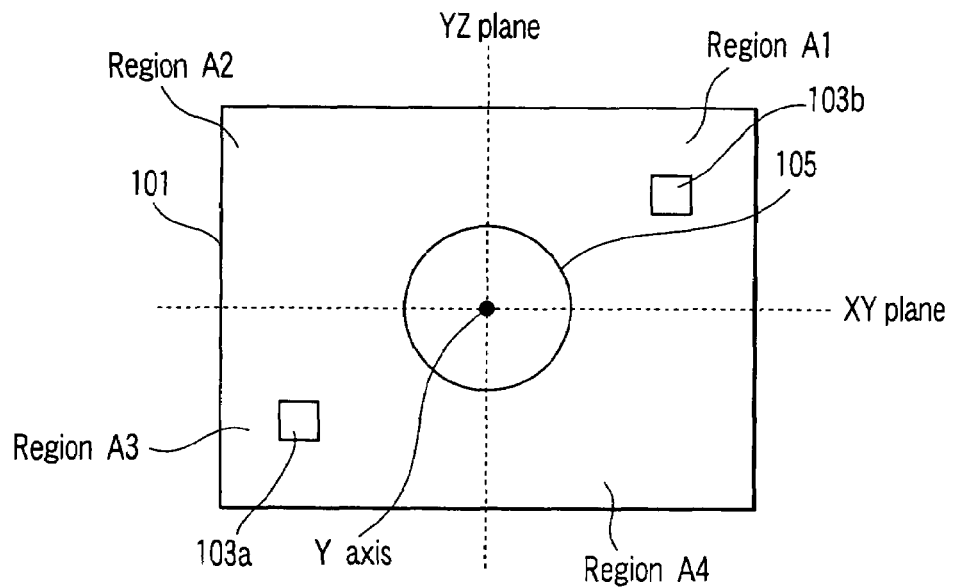
F I G. 8
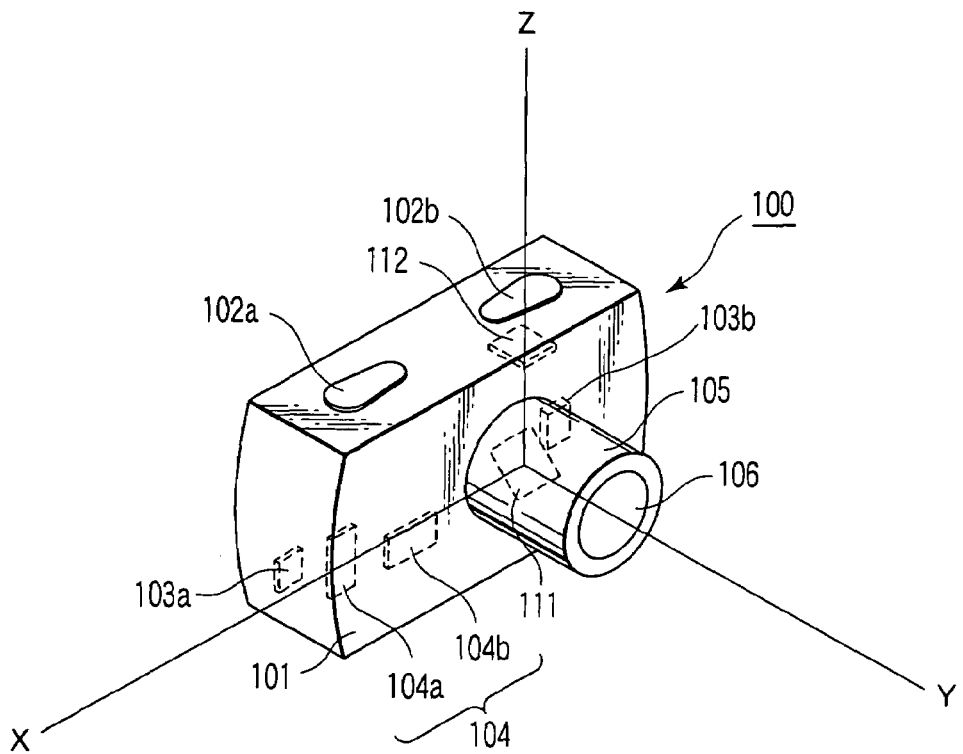
F I G. 9

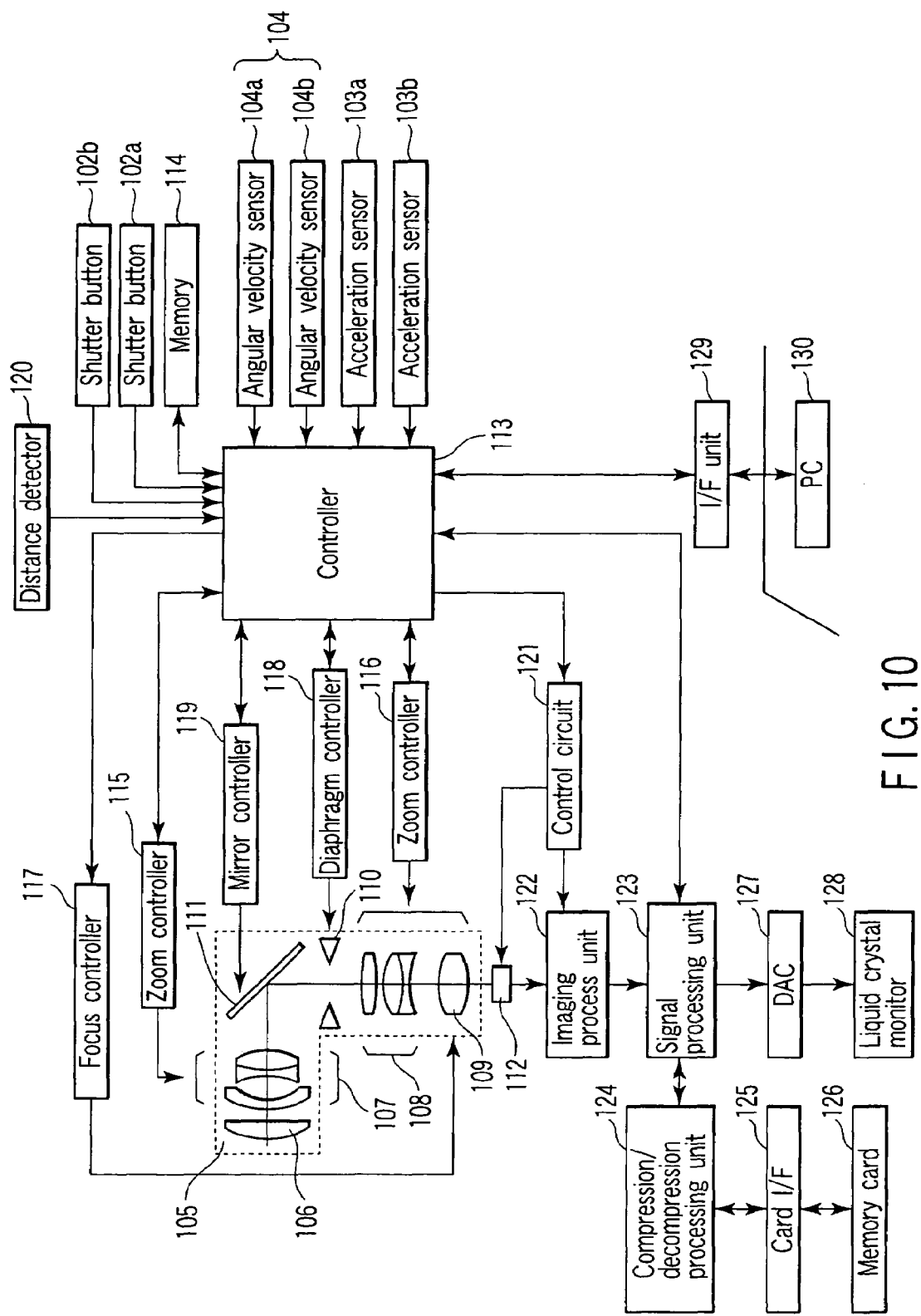
F I G. 10

IMAGE CAPTURE DEVICE

CROSS-REFERENCE TO RELATED APPLICATIONS

This is a Continuation Application of PCT Application No. PCT/JP2004/007460, filed May 25, 2004, which was published under PCT Article 21(2) in Japanese.

This application is based upon and claims the benefit of priority from prior Japanese Patent Application No. 2003-163926, filed Jun. 9, 2003, the entire contents of which are incorporated herein by reference.

BACKGROUND OF THE INVENTION

1. Field of the Invention

The present invention relates to an image capture device and more particularly to a technique to compensate for image blur (camera shake).

2. Description of the Related Art

Image blur compensation devices for use with image capture devices include one that uses an angular velocity sensor. This compensation device detects information concerning swing of the image capture device through the use of the angular velocity sensor and then shifts the entire lens barrel, a part of the optical system, or the imaging portion using that information, thereby making compensation for image blur.

However, in the case of swing detection using the angular velocity sensor, there arises a problem in that, although effective compensation is possible when the center of swing is in the vicinity of the compensation optical system of the camera, proper compensation cannot be made when the center of swing is apart from the compensation optical system. With digital cameras, a liquid crystal monitor is provided on the back of the camera. Also, many digital cameras have been downsized. For this reason, users may hold the camera in one hand and take a picture while viewing the liquid crystal monitor. In such a case, the users will move the camera with their shoulder or elbow at the center, so that the center of swing is located greatly apart from the camera. Thus, difficulties are involved in making proper compensation for image blur.

To solve such a problem, in Japanese Patent Publication No. 2872509 is proposed a technique which assumes the center of swing in advance and determines a correction amount according to the distance to a subject.

Moreover, in Japanese Patent Publication No. 3170716 is proposed a technique in which plural detectors are scatter placed on the lens barrel or the outside of the casing of a camera, the center of swing is determined from the results of detection by the detectors, and image blur compensation is made on the basis of the determined result.

BRIEF SUMMARY OF THE INVENTION

An image capture device according to a first aspect of the present invention comprises imaging means; first motion detecting means for detecting a rotational component of motion; second motion detecting means for detecting a translational component of the motion; and compensation means for making compensation for image blur of an image captured by the imaging means on the basis of output signals of the first and second motion detecting means.

An image capture device according to a second aspect of the present invention comprises imaging means; first motion detecting means for detecting a rotational component of motion; a plurality of second motion detecting means for detecting a translational component of the motion; and compensation means for making compensation for image blur of an image captured by the imaging means on the basis of output signals of the first motion detecting means and at least one of the second motion detecting means.

BRIEF DESCRIPTION OF THE SEVERAL VIEWS OF THE DRAWING

FIG. 1 is a schematic perspective view illustrating the exterior structure of an image capture device according to a first embodiment of the present invention;

FIG. 2 is a block diagram of the image capture device of the first embodiment of the present invention;

FIG. 3 shows an example of the structure of the variable mirror;

FIGS. 4A and 4B show an example of the electrode arrangement of the variable mirror;

FIG. 8 schematically shows an arrangement of a three-axis acceleration sensor in the second embodiment of the present invention;

FIG. 9 is a schematic perspective view illustrating the exterior structure of an image capture device according to a third embodiment of the present invention;

FIG. 10 is a block diagram of the image capture device of the third embodiment of the present invention.

DETAILED DESCRIPTION OF THE INVENTION

Figure 5:
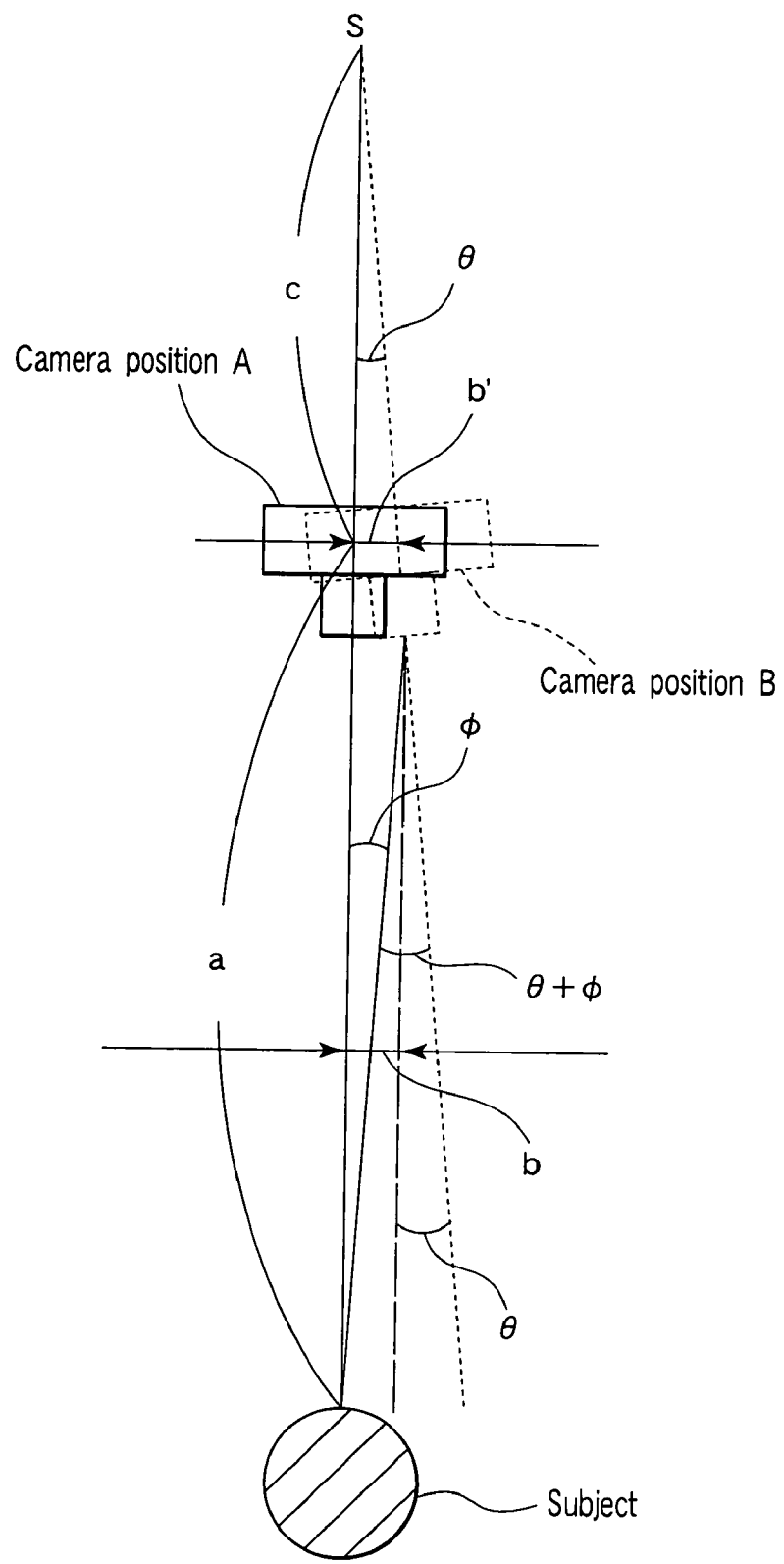
FIG. 5 is a diagram for use in explanation of the principles of image blur compensation in the image capture device of the present invention.

The embodiments of the present invention will be described hereinafter with reference to the accompanying drawings.

First Embodiment

FIG. 1 is a schematic perspective view illustrating the exterior structure of a digital camera (image capture device) according to a first embodiment of the present invention and FIG. 2 is a block diagram of the digital camera of the first embodiment.

The digital camera 100 is provided on the top of its main body 101 with a shutter button 102 adapted to instruct the commencement of shooting. Inside the main body 101 are provided a three-axis acceleration sensor 103 adapted to detect the translational component of motion and an angular velocity sensor 104 (composed of sensors 104a and 104b) adapted to detect the rotational component of the motion.

Inside a lens barrel module 105 are provided a first lens group 106, a second lens group 107, a third lens group 108, a fourth lens group 109, a diaphragm 110, and a variable mirror 111. A subject image passes through the first and second lens groups 106 and 107, then is reflected by the variable mirror 111 into the third and fourth lens groups 108 and 109 and formed onto a CCD (imaging device) 112. The CCD 112 provides photoelectric conversion of the formed subject image to output an electric signal. The optical axis directed from the first lens group 106 to the variable mirror 111 corresponds to the Y axis shown in FIG. 1 and the optical axis directed from the variable mirror 111 to the CCD 112 corresponds to the Z axis.

A controller 113 exercises control over the entire digital camera. A control program has been previously stored in a ROM in a memory 114. The memory 114 also contains a RAM, which is used as a working storage area when the controller 113 executes the control program.

A zoom controller 115 controls the second lens group 107 in response to a command from the controller 113. A zoom controller 116 controls the third and fourth lens groups 108 and 109 in response to a command from the controller 113. The angle of view is adjusted by these control operations. A focus controller 117 drives the fourth lens group 109 in response to a command from the controller 113 to make focusing adjustments. A diaphragm controller 118 controls the diaphragm 110 in response to a command from the controller 113.

A mirror controller 119 controls the tilt angle of the reflecting surface of the mirror 111 in response to a command from the-controller 113. The control of the tilt angle is performed on the basis of output signals from the three-axis acceleration sensor 103 and the angular velocity sensor 104. The digital camera 100 is also equipped with a distance detector 120 to detect the distance to a subject. The distance information from the distance detector 120 is also used in controlling the tilt angle. By controlling the tilt angle of the mirror 111 in this manner, image blur compensation is made at image capture time. The details of those operations will be described later.

A control circuit 121 controls the CCD 112 and an imaging process unit 122 in response to commands from the controller 113. The imaging process unit 122 includes a CDS (Correlated Double Sampling) circuit, an AGC (Automatic Gain Control) circuit, and an ADC (Analog to Digital Converter). The image processing unit 122 performs given processing on an analog signal output from the CCD 112 and then converts the processed analog signal into a digital signal.

A signal processing unit 123 performs processing, such as white balance, gamma correction, etc., on image data output from the imaging process unit 122 and image data output from a compression/decompression processing unit 124. An AE (Automatic Exposure) detection circuit and an AF (Automatic Focus) detection circuit are also included in the signal processing unit 123.

The compression/decompression processing unit 124 performs image data compression and decompression processes: compression on image data output from the signal processing unit 123 and decompression on image data output from a card interface (I/F) 125. For the image data compression and decompression processes, use is made of the JPEG (Joint Photographic Experts Group) scheme by way of example. The card I/F 125 allows data communications between the digital camera 100 and a memory card 126 to provide image data write and read processing. The memory card 126, which is a semiconductor recording medium for data recording, can be removably loaded into the digital camera 100.

A DAC (Digital to Analog Converter) 127 is adapted to convert a digital signal (image data) output from the signal processing unit 123 into an analog signal. A liquid crystal display monitor 128 displays an image based on the analog signal output from the DAC 127. This liquid crystal display monitor 101 is provided on the rear side of the camera main body 101. The user is allowed to capture an image while viewing the liquid crystal display monitor 128.

An interface unit (I/F unit) 129, which is adapted to make data communications between the controller 113 and a personal computer (PC) 130, uses an interface circuit adapted for, for example, the USB (Universal Serial Bus). The personal computer 130 is used to write focus sensitivity correction data for the CCD 112 into the memory 114 and load various pieces of data into the mirror controller 119 in advance at the stage of manufacture of the digital camera. Therefore, the personal computer 130 is not an ingredient of the digital camera 100.

FIG. 3 shows an example of the structure of the variable mirror 111 and FIGS. 4A and 4B show an example of the electrode arrangement of the variable mirror 111. The variable mirror 111 shown in FIGS. 3, 4A and 4B is fabricated through the use of the so-called MEMS (Micro Electro-Mechanical System) technology.

As shown in FIG. 3, the variable mirror 111 is equipped with an upper substrate 201, a lower substrate 221 opposed to the upper substrate 201, springs 251 to 254 each of which has its both ends respectively connected to the upper substrate 201 and the lower substrate 221, and a pivot 261 which supports the substantial central portion of the upper substrate 201.

The upper substrate 201 has an upper electrode 202 and an external lead electrode 203. The upper substrate 201 is formed on its surface with a reflecting portion 204 which reflects light from a subject onto the CCD. The upper electrode 202 is sandwiched between thin films 205 and made parallel to the reflecting surface of the reflecting portion 204. The upper electrode 202 is formed nearly in the shape of a rectangle as shown in FIG. 4A. The external lead electrode 203 is used to provide electrical connection between the upper electrode 202 and the outside and its surface is exposed.

The lower substrate 221 has four lower electrodes 222 to 225 and four external lead electrodes 226 to 229 over a semiconductor substrate 230. The lower electrodes 222 to 225 are sandwiched between thin films 231 and positioned to face the upper electrode 202. The external lead electrodes 226 to 229 are used to provide electrical connection between the lower electrodes 222 to 225 and the outside and their surface is exposed.

The four springs 251 to 254 are placed between the upper substrate 201 and the lower substrate 221 to couple both the substrates. The pivot 261 is formed in the position corresponding to the center of the four springs 251 to 254, or the center of the four lower electrodes 222 to 225 (the intersection of X and Y axes in FIG. 4B) and pushes the upper substrate 201 in the position of its center of gravity by tensile force of the springs 251 to 254.

In the variable mirror 111 thus structured, the tilt of the upper substrate 201 relative to the lower substrate 221 can be changed by means of electrostatic force by changing the potential difference applied between the upper electrode 202 and each of the lower electrodes 222 to 225. Thereby, the tilt angle of the reflecting portion 204 is changed, allowing compensation for image blur to be made.

Next, the principles of the image blur compensation in the digital camera of the present embodiment will be described with reference to FIG. 5.

In FIG. 5, suppose that the digital camera swung from camera position A to camera position B with a reference position S (e.g., the position of the shoulder of the user) at the center within a given period of time during exposure. In this case, the swing angle $\theta$ can be determined by integrating an output signal of the angular velocity sensor 104. However, since the center of swing (reference point S) is apart from the camera, the angle $\theta$ is smaller than an angle to be actually corrected. For this reason, it is required to determine an angle $(\theta+\phi)$ by adding an angle $\phi$ to the angle $\theta$.

The angle φ can be determined as follows: When θ is sufficiently small, the amount b' of movement which approximates the amount b of movement in the X-axis direction of the center position of the camera can be determined by integrating twice that output signal of the three-axis acceleration sensor 103 which is associated with the X-axis direction (see FIG. 1). The distance a between the camera and a subject can be obtained by the distance detecting unit 120. Once the amount b' of movement and the distance a have been determined, the angle φ can be obtained from arctan(b'/a). The correction tilt angle of the mirror 111 can be determined by obtaining the actually required correction angle (θ+φ) in this manner, allowing proper compensation for image blur to be made.

The distance a to the subject can be obtained by an auto-focusing operation performed prior to the commencement of image capture. With detection at a sampling rate of, say, 2 kHz, the sampling interval is 0.5 m seconds. The amount θ of rotation in 0.5 m seconds is sufficiently small. Therefore, the aforementioned correction processing can be performed with sufficient accuracy.

As described above, according to this embodiment, a correction angle actually required is calculated using output signals of the three-axis acceleration sensor 103 and the angular velocity sensor 104. Thereby, proper image blur compensation can be made even if the center of swing is apart from the camera.

When the camera swings with the wrist at the center, that is, when the center of swing is in the vicinity of the camera, the rotational component of swing is dominant. Thus, even with correction using only the output signal of the angular velocity sensor 104, some degree of correction accuracy can be obtained. The three-axis acceleration sensor 103 is adapted to generate an output signal corresponding to acceleration in three directions (X direction, Y direction and Z direction). It is practically impossible to completely eliminate crosstalk. Therefore, when the center of swing is present in the vicinity of the camera, for example, at the wrist, the correction amount may be calculated exclusively using an output signal of the angular velocity sensor 104 without using an output signal of the three-axis acceleration sensor 103. Specifically, the following measures can be taken.

Whether or not the three-axis acceleration sensor 103 is to be used in calculating the correction amount, it is merely required to decide whether or not the output signal of the three-axis acceleration sensor 103 has a predetermined value or more by means of the controller 113, by way of example. When the output signal of the three-axis acceleration sensor 103 is smaller than the predetermined value, the rotational component of swing is dominant. Therefore, the output signal of the angular velocity sensor 103 is used exclusively without using the output signal of the three-axis acceleration sensor 103. In other words, when the output signal of the three-axis acceleration sensor 103 is not less than the predetermined value, the correction amount is calculated using the output signal of the three-axis acceleration sensor 103 and the angular velocity sensor 104. Thereby, it becomes possible to make proper image blur compensation corresponding to the type of shake.

Figure 11:
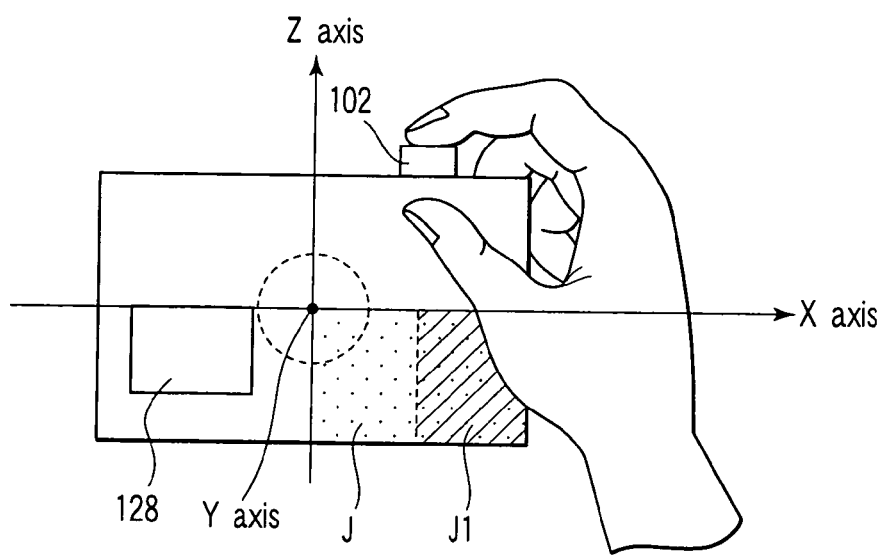
FIG. 11 schematically shows the position where the three-axis acceleration sensor is placed in the first embodiment of the present invention.

To minimize the effect of swing on the three-axis acceleration sensor 103, it is desirable to place the three-axis acceleration sensor 103 as close to the center of swing as possible. When holding the camera in one hand, the user holds the camera on the shutter button 102 side of the camera main body. The camera swings mainly with the wrist at the center. It is therefore desirable to place the three-axis acceleration sensor 103 in the vicinity of a portion which is held in operating the shutter button 102. In holding the camera in one hand, the wrist is commonly positioned below the bottom of the camera and outside that side of the camera which is close to the shutter button 102 as shown in FIG. 11. To position the three-axis acceleration sensor 103 in the vicinity of the wrist which is the center of swing, therefore, it is desirable to place it in a region J (shown dotted) which is below the XY plane (plane including X and Y axes) and to the right of the YZ plane (plane including Y and Z axes). It is preferable to place the three-axis acceleration sensor 103 in a region J1 (shown hatched) which is the right half of the region J. By placing the sensor in this manner, the effect of the rotational component on the three-axis acceleration sensor 103 can be reduced, when the center of swing is in the vicinity of the camera. Therefore, swing can be detected with accuracy, allowing proper compensation for image blur to be made.

When capturing an image while viewing through the camera viewfinder, the center of swing is in the vicinity of the camera, such as the wrist, etc., as described above. In contrast, when capturing an image while viewing the liquid crystal display monitor 128 installed on the rear side of the camera, the center of swing is the shoulder or elbow, which is distant from the camera. Thus, when the center of swing is positioned apart from the camera, it is required to calculate the correction amount using both the output signals of the three-axis acceleration sensor 103 and the angular velocity sensor 104. Thus, when the liquid crystal display monitor 128 is in the non-operating state, only the output signal of the angular velocity sensor 104 is used to make image blur compensation. When the liquid crystal display monitor 128 is in the operating state, both the output signals of the three-axis acceleration sensor 103 and the angular velocity sensor 104 may be used to make image blur compensation. Thereby, the center of swing can be judged exactly according to shooting situations, allowing proper image blur compensation to be made.

Although this embodiment has been described mainly in terms of swing the rotational axis of which is parallel to the Z axis, it goes without saying that the same method can also be adopted for swing the rotational axis of which is parallel to the X axis.

Second Embodiment

Figure 6:
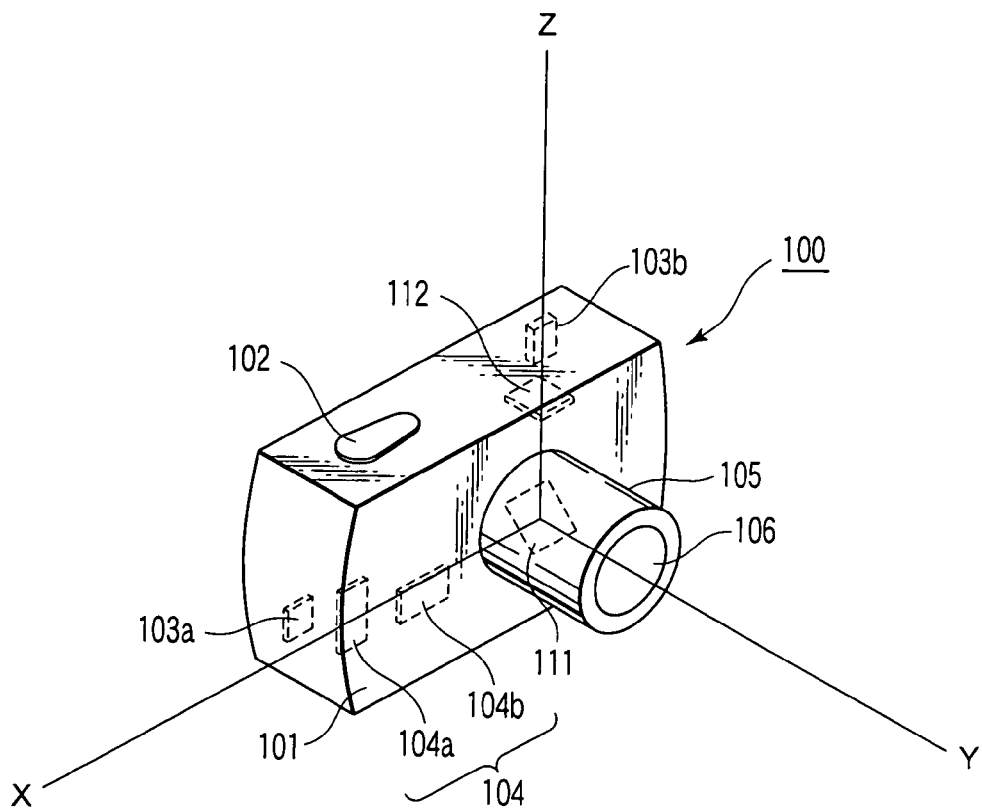
FIG. 6 is a schematic perspective view illustrating the exterior structure of an image capture device according to a second embodiment of the present invention.
Figure 7:
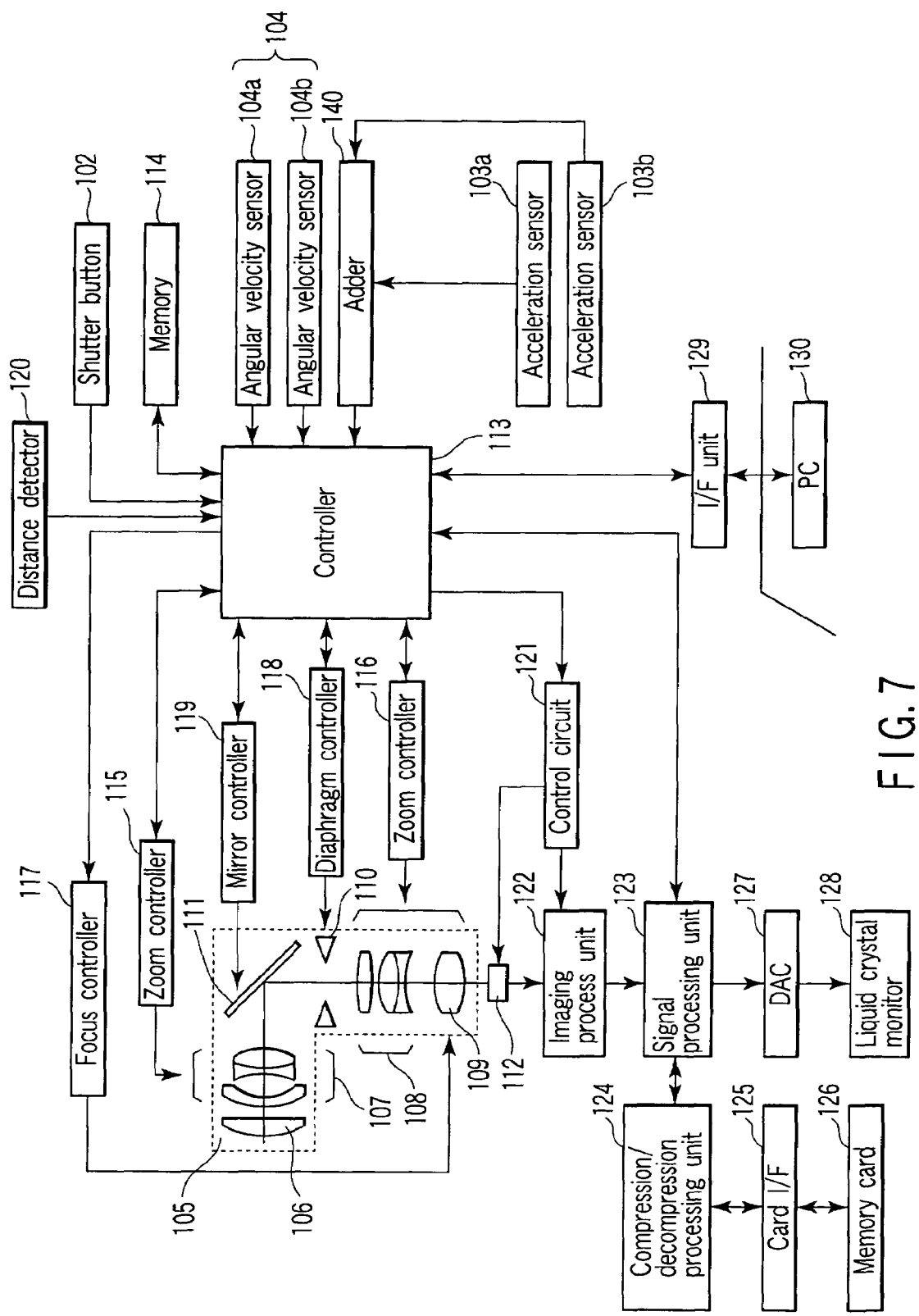
FIG. 7 is a block diagram of the image capture device of the second embodiment of the present invention.

FIG. 6 is a schematic perspective view of a digital camera (image capture device) according to a second embodiment. FIG. 7 is a block diagram of the digital camera of the second embodiment. Since the basic configuration of this embodiment is the same as that of the first embodiment, corresponding parts to those in the first embodiment are denoted by like reference numerals and detailed descriptions thereof are omitted. Many matters described in the first embodiment apply to this embodiment as well and hence descriptions thereof are also omitted.

This embodiment is equipped with three-axis acceleration sensors 103*a* and 103*b*. Also, an adder 140 is provided by which the output signals of the three-axis acceleration sensors 103*a* and 103*b* are added together. The three-axis acceleration sensors 103*a* and 103*b* have the same characteristics.

As shown in FIG. 6, suppose that, with the center of the variable mirror 111 set at the origin, the optical axis directed from the center of the first lens group 106 to the center of the variable mirror 111 is the Y axis, the optical axis directed from the center of the variable mirror 111 to the center of the CCD 112 is the Z axis, the axis orthogonal to the Y and Z axes is the X axis, the horizontal plane including the X and Y axes is the XY plane, and the vertical plane including the Y and Z axes is the YZ plane. Then, the three-axis acceleration sensors 103*a* and 103b are set so that each of them is placed in a respective one of the two diagonally located regions of the four regions partitioned by the XY and YZ planes.

FIG. 8 schematically illustrates the abovementioned contents. The three-axis acceleration sensors 103a and 103b are placed in the regions A3 and A1, respectively, of the four regions A1 to A4 partitioned by the XY and YZ planes. Of course, it is allowed to place the three-axis acceleration sensors 103a and 103b in the regions A1 and A3, respectively. Ideally, it is desirable that Xa=−Xb and Za=−Zb where Xa and Za are the X and Z coordinates, respectively, of the location where the three-axis acceleration sensor 103a is placed and Xb and Zb are the X and Z coordinates, respectively, of the location where the three-axis acceleration sensor 103b is placed.

Here, consider swing the rotational axis of which is parallel to the Z axis. When the center of swing is the Z axis, the outputs associated with the X-axis direction of the three-axis acceleration sensors 103a and 103b are equal in absolute value but opposite in sign. Therefore, the result of addition of the outputs in the adder 140 becomes zero. As a result, the add angle φ (see FIG. 5) becomes zero and the angle θ obtained from the output of the angular velocity sensor 104 becomes the correction angle. As the center of swing is farther away from the z axis, the result of addition in the adder 140 becomes larger and the add angle φ also becomes larger. Thus, by adding the outputs of the three-axis acceleration sensors 103a and 103b together, the actually required correction angle (θ+φ) can be exactly obtained even if complicated operations are not performed.

When the difference in absolute value between the outputs associated with the X-axis direction of the three-axis acceleration sensors 103a and 103b is less than a predetermined value, the rotational component of swing is dominant. In this case, therefore, it is allowed to use only the output signal of the angular velocity sensor 104 without using the output signals of the three-axis acceleration sensors 103a and 103b. In other words, when the difference in absolute value is not less than the predetermined value, the correction amount may be calculated using the output signals of the three-axis acceleration sensors 103a and 103b and the angular velocity sensor 104.

Thus, this embodiment allows proper image blur compensation to be made according to the position of the center of swing through the use of plural three-axis acceleration sensors. In particular, acceleration components in the opposite directions can be canceled out by placing two three-axis acceleration sensors in diagonal positions. It therefore becomes possible to make proper image blur compensation without performing complicated operations processing.

Although this embodiment has been described mainly in terms of swing the rotational axis of which is parallel to the Z axis, it goes without saying that the same method can also be adopted for swing the rotational axis of which is parallel to the X axis.

Third Embodiment

FIG. 9 is a schematic perspective view of a digital camera (image capture device) according to a third embodiment. FIG. 10 is a block diagram of the digital camera of the third embodiment. Since the basic configuration of this embodiment is the same as that of the first embodiment, corresponding parts to those in the first embodiment are denoted by like reference numerals and detailed descriptions thereof are omitted. Many matters described in the first embodiment apply to this embodiment as well and hence descriptions thereof are also omitted.

This embodiment is equipped with three-axis acceleration sensors 103a and 103b. A shutter button 102a is provided in the vicinity of the three-axis acceleration sensor 103a and a shutter button 102b is provided in the vicinity of the three-axis acceleration sensor 103b.

In a state where the shutter button 102a or 102b has been depressed halfway, the controller 113 makes a decision of which of the shutter buttons 102a and 102b has been operated. When the shutter button 102a has been operated, the controller 113 selects the three-axis acceleration sensor 103a placed in the vicinity of the shutter button 102a. When the shutter button 102b has been operated, the controller 113 selects the three-axis acceleration sensor 103b placed in the vicinity of the shutter button 102b. Using the output signal of the selected three-axis acceleration sensor, the correction angle (θ+φ) is determined by the same method as with the first embodiment and then reflected in image blur compensation.

Thus, this embodiment allows proper image blur compensation to be made according to the position of the center of swing through the use of plural three-axis acceleration sensors and plural shutter buttons. In particular, by placing each of the three-axis acceleration sensors in the vicinity of a corresponding one of the shutter buttons, it becomes possible to make proper image blur compensation according to the grip position of the user.

What is claimed is:

1. An image capture device comprising:
   imaging means for capturing an image;
   first motion detecting means for detecting a rotational component of motion;
   second motion detecting means for detecting a translational component of the motion; and
   compensation means for compensating for image blur of an image captured by the imaging means based on output signals of the first and second motion detecting means;
   wherein the compensation means performs image blur compensation using the output signals of the first and second motion detecting-means when the output signal of the second motion detecting means has a predetermined value or more.

2. An image capture device comprising:
   imaging means for capturing an image;
   first motion detecting means for detecting a rotational component of motion;
   a plurality of second motion detecting means for detecting a translational component of the motion;
   compensation means for compensating for image blur of an image captured by the imaging means based on output signals of the first motion detecting means and at least one of the second motion detecting means;
   a plurality of shooting commencement instructing means for instructing commencement of shooting; and
   selecting means for selecting a second motion detecting means corresponding to a shooting commencement instructing means being operated,
   wherein the compensation means performs image blur compensation using the second motion detecting means selected by the selecting means.

3. The image capture device according to claim 2, wherein the selecting means selects a second motion detecting means placed in the vicinity of the operated shooting commencement instructing means.

4. The image capture device according to claim 3, further comprising an optical system having an optical axis normal to a front of a main body of the image capture device,
    wherein the second motion detecting means selected by the selecting means is placed in a region which includes the operated shooting commencement instructing means, and is positioned between a first vertical plane including the optical axis and a second plane including a side of the main body of the image capture device, and is positioned closer to the second plane than to the first plane.

5. The image capture device according to claim 4, wherein the second motion detecting means selected by the selecting means is placed in a region between a third horizontal plane including the optical axis and a fourth plane including a bottom of the main body of the image capture device.

6. An image capture device comprising:
    imaging means for capturing an image;
    first motion detecting means for detecting a rotational component of motion;
    a plurality of second motion detecting means for detecting a translational component of the motion;
    compensation means for compensating for image blur of an image captured by the imaging means based on output signals of the first motion detecting means and at least one of the second motion detecting means; and
    an optical system having an optical axis normal to a front of a main body of the image capture device,
    wherein the main body of the image capture device has four regions partitioned by a horizontal plane including the optical axis and a vertical plane including the optical axis, and two second motion detecting means are each placed in a respective one of two diagonally opposed regions of the four regions.

7. An image capture device comprising:
    imaging means for capturing an image;
    first motion detecting means for detecting a rotational component of motion;
    a plurality of second motion detecting means for detecting a translational component of the motion;
    compensation means for compensating for image blur of an image captured by the imaging means based on output signals of the first motion detecting means and at least one of the second motion detecting means; and
    adding means for adding output signals of two second motion detecting means together.

8. An image capture device comprising:
    imaging means for capturing an image;
    first motion detecting means for detecting a rotational component of motion;
    a plurality of second motion detecting means for detecting a translational component of the motion; and
    compensation means for compensating for image blur of an image captured by the imaging means based on output signals of the first motion detecting means and at least one of the second motion detecting means;
    wherein the compensation means performs image blur compensation using an output signal of the first motion detecting means and output signals of two second motion detecting means when a difference in absolute value between the output signals of the two second motion detecting means is not less than a predetermined value.

* * * * *